(12) United States Patent
Geisberger et al.

(10) Patent No.: US 7,655,811 B2
(45) Date of Patent: Feb. 2, 2010

(54) METHOD FOR PRODUCING OH-TERMINAL ORGANO HYDROGEN POLYSILOXANES

(75) Inventors: Gilbert Geisberger, Altoetting (DE); Christian Herzig, Waging (DE); Tassilo Lindner, Mehring (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/088,967

(22) PCT Filed: Sep. 29, 2006

(86) PCT No.: PCT/EP2006/066901

§ 371 (c)(1),
(2), (4) Date: Apr. 2, 2008

(87) PCT Pub. No.: WO2007/039565

PCT Pub. Date: Apr. 12, 2007

(65) Prior Publication Data

US 2008/0269453 A1    Oct. 30, 2008

(30) Foreign Application Priority Data

Oct. 6, 2005   (DE) ............... 10 2005 048 035

(51) Int. Cl.
*C07F 7/00* (2006.01)
(52) U.S. Cl. ............ 556/450; 528/31; 556/451; 556/463; 556/465; 556/466
(58) Field of Classification Search ........... 556/450, 556/451, 463, 465–466; 528/31, 499
See application file for complete search history.

(56) References Cited

U.S. PATENT DOCUMENTS

| 5,169,970 | A  |   | 12/1992 | Ohkawa |
| 5,548,053 | A  | * | 8/1996  | Weidner et al. ............... 528/14 |
| 6,143,912 | A  | * | 11/2000 | Lindner et al. ............. 556/451 |
| 6,232,423 | B1 | * | 5/2001  | Kohler et al. ................ 528/12 |
| 7,208,617 | B2 | * | 4/2007  | Gammie ..................... 556/450 |

FOREIGN PATENT DOCUMENTS

| DE | 3126343 A1  | 1/1983 |
| DE | 10311724 A1 | 10/2004 |
| EP | 0967236 A1  | 12/1999 |
| JP | 07330904 A  | 12/1995 |

OTHER PUBLICATIONS

English Patent Abstract corres. to EP 0967236 A1.
English Patent Abstract corres. to DE 3126343 A1.
English Patent Abstract corres. to DE 10311724 A1.
English Patent Abstract corres. to JP 073330904.

* cited by examiner

*Primary Examiner*—Olatunde S Ojurongbe
(74) *Attorney, Agent, or Firm*—Brooks Kushman P.C.

(57) ABSTRACT

Hydroxyl-terminal organopolysiloxanes having diorganosiloxy groups and Si—H groups are prepared by reacting the appropriate chlorosilanes with less than 0.5 mol water per mol of hydrolyzable chlorine in a first step and recovering gaseous HCl, and more fully hydrolyzing with additional water in a second step.

7 Claims, 1 Drawing Sheet

METHOD FOR PRODUCING OH-TERMINAL ORGANO HYDROGEN POLYSILOXANES

CROSS-REFERENCE TO RELATED APPLICATION

Figure 1:
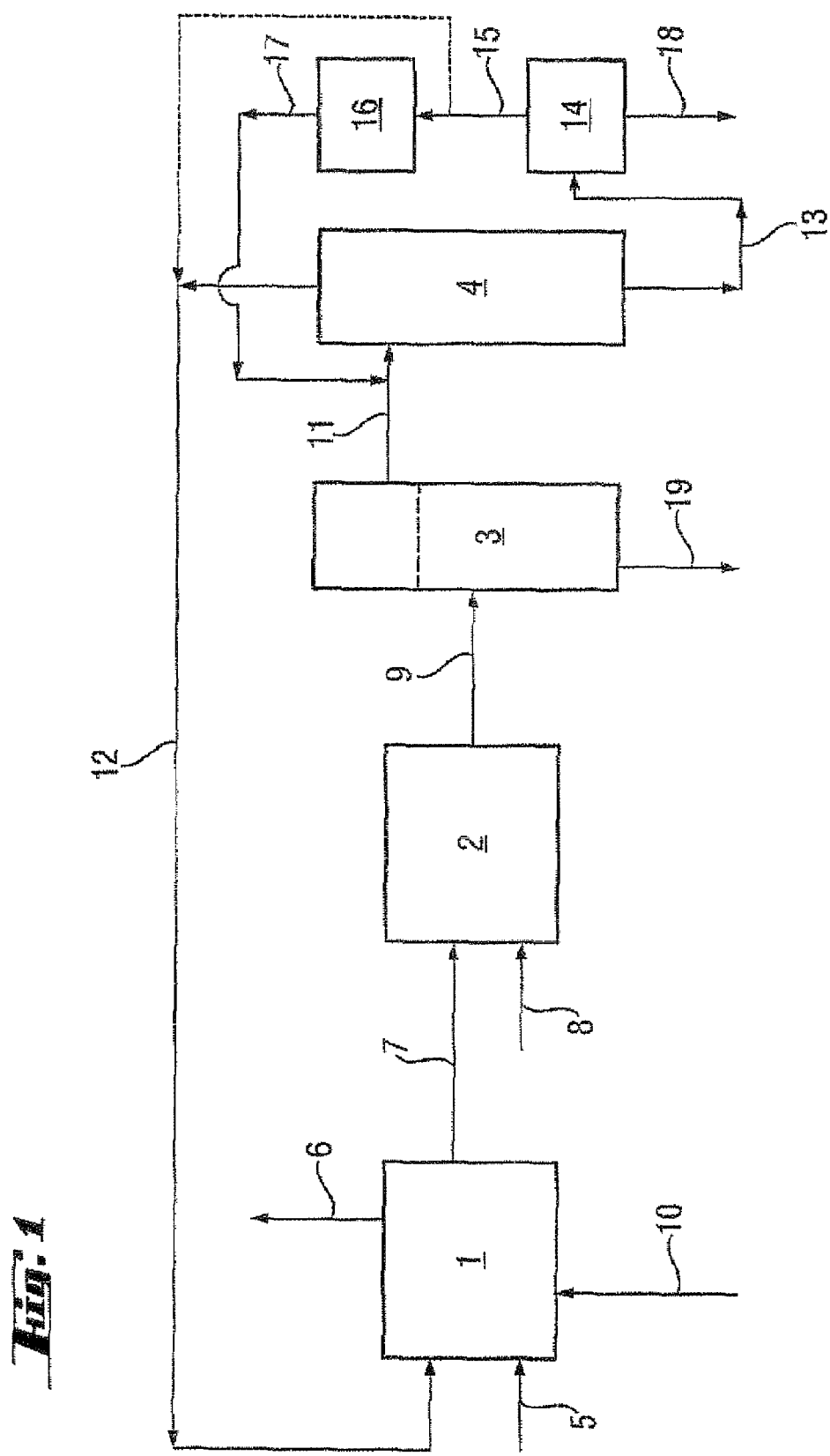

This application is the U.S. national phase of PCT Appln. No. PCT/EP2006/066901 filed Sep. 29, 2006 which claims priority to German application DE 10 2005 048 035.7 filed Oct. 6, 2005.

BACKGROUND OF TILE INVENTION

1. Field of the Invention

The invention relates to a process for preparing OH-terminal organopolysiloxanes having diorganosiloxy units and Si—H groups.

2. Description of the Related Art

EP 967236 A describes the preparation of hydromethylpolysiloxanes with trimethylsilyl end groups in a two-stage process from methyldichlorosilane, trimethyl-chlorosilane and water.

JP 07330904 A describes a process for preparing OH-terminal organohydropolysiloxanes by ring-opening copolymerization of cyclic hydrosiloxane and cyclic siloxane.

DE 3126343 A describes the preparation of OH-terminal organohydropolysiloxanes by cohydrolysis of methyldichlorosilane, dimethyldichlorosilane and water. In the course of preparation and storage of the products, hydrogen is eliminated, which gives rise to branches and leads to gelation of the products. The uncontrolled condensation of the terminal Si—OH groups leads to highly viscous products.

SUMMARY OF THE INVENTION

It is an object of the invention to provide a simplified process for preparing linear OH-terminal organopolysiloxanes having diorganosiloxy units and Si—H groups. These and other objects are achieved by a process for preparing OH-terminal organohydropolysiloxanes (P), in which, in a first step, organohydrodichlorosilanes (A) and diorganodichlorosilanes (B) are reacted with at most 0.5 mol of water per mol of hydrolyzable chlorine to give a partial hydrolyzate (T) and gaseous hydrogen chloride, and, in a second step, the partial hydrolyzate (T), to remove the SiCl groups still present, is treated with water to form hydrochloric acid, while obtaining a hydrolyzate (H) comprising the organohydropolysiloxanes (P).

The invention provides a process for preparing OH-terminal organohydropolysiloxanes (P), in which, in a first step, organohydrodichlorosilanes (A) and diorganodichlorosilanes (B) are reacted with at most 0.5 mol of water per mol of hydrolyzable chlorine to give a partial hydrolyzate (T) and gaseous hydrogen chloride, and, in a second step, the partial hydrolyzate (T), to remove the SiCl groups still present, is treated with water to form hydrochloric acid, while obtaining a hydrolyzate (H) comprising the organohydropolysiloxanes (P).

DETAILED DESCRIPTION OF THE PREFERRED EMBODIMENT

In the process, the linear organohydropolysiloxanes (P) are prepared directly from the organochlorosilanes. The additional process stage needed to date, that of the ring-opening reaction of at least two different organocyclosiloxanes, is dispensed with.

The process is easy to control; the formation of branches in the organohydropolysiloxanes (P) does not occur since the elimination of hydrogen is suppressed. The organohydropolysiloxanes (P) also do not tend to gel in the course of preparation. Moreover, a high proportion of the chlorine of the starting materials is obtained as HCl gas.

The organohydropolysiloxanes (P) prepared by the process according to the invention are notable for excellent storage stability.

The hydrolyzable chlorine is present in the form of SiCl groups. Preferably, in the first step, at least 0.3 mol of water is used per mole of hydrolyzable chlorine.

In the organohydropolysiloxanes (P), the organohydro siloxy units and diorganosiloxy units may have any distribution. A random distribution or a distribution in blocks is possible.

The OH-terminal organohydropolysiloxanes (P) preferably have the general formula 1

$$HO(SiR_2O)_m(SiR^1_2O)_nH \qquad (1)$$

in which
R$^1$ is hydrogen or a hydrocarbon radical which is optionally substituted by halogen or cyano radicals and has from 1 to 18 carbon atoms,
R is a hydrocarbon radical which is optionally substituted by halogen or cyano radicals and has from 1 to 18 carbon atoms,
m is an integer from 1 to 1000 and
n is integers an integer from 1 to 1000,
with the proviso that at least one R$^1$ radical is hydrogen.

The organohydrodichlorosilanes (A) used in the first step preferably have the general formula 2

$$R^1_2SiCl_2 \qquad (2)$$

in which R$^1$ is as defined above.

The diorganodichlorosilanes (B) used in the first step preferably have the general formula 3

$$R_2SiCl_2 \qquad (3)$$

in which R is as defined above.

Preferably, the hydrocarbons R and R$^1$ are a hydrocarbon radical which is free of ethylenically or acetylenically unsaturated bonds and has from 1 to 18 carbon atoms.

Examples of hydrocarbon radicals R and R$^1$ are alkyl radicals, such as the methyl, ethyl, n-propyl, isopropyl, n-butyl, isobutyl, tert-butyl, n-pentyl, isopentyl, neopentyl, tert-pentyl radical, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as cyclopentyl, cyclohexyl, cycloheptyl radicals and methylcyclohexyl radicals; aryl radicals such as the phenyl, naphthyl and anthryl and phenanthryl radical; alkaryl radicals such as o-, m-, p-tolyl radicals, xylyl radicals and ethylphenyl radicals; aralkyl radicals such as the benzyl radical, and the alpha- and the β-phenylethyl radical.

Examples of substituted hydrocarbon radicals R and R$^1$ radicals are cyanalkyl radicals such as the β-cyanoethyl radical, and halogenated hydrocarbon radicals, for example haloalkyl radicals such as the 3,3,3-trifluoro-n-propyl radical, the 2,2,2,2',2',2'-hexafluoro-isopropyl radical, the heptafluoroisopropyl radical, and haloaryl radicals such as the o-, m- and p-chlorophenyl radical.

The R and R¹ radicals are preferably each a phenyl radical or linear alkyl radical, especially those having from 1 to 10, particularly from 1 to 6 carbon atoms. Particularly preferred hydrocarbon radicals R and R1 are the n-propyl, ethyl, and especially the methyl radical.

m is preferably at most 200, more preferably at most 50. n is preferably at most 500, more preferably at most 250.

Preferably, the content of the hydrogen atoms present in the form of Si—H in the organohydropolysiloxane (P) is from 0.001 to 1.3% by weight, more preferably from 0.05 to 1.1% by weight.

Preferred mixtures used in the first step are (methyl=Me):

$Me_2SiCl_2/MeSiHCl_2$ $PropylMeSiCl_2/MeSiHCl_2$ $Me_2SiCl_2/PhenylMeSiCl_2/MeSiHCl_2$ $CyclopentylSiHCl_2/Me_2SiCl_2$ $IsooctylSiHCl_2/Me_2SiCl_2$ The process according to the invention is outstandingly suitable for preparing nonvolatile organohydropoly-siloxanes (P), for example OH-terminated hydropoly-siloxanes with dimethylsilyl groups. The organohydro-polysiloxanes (P) preferably have a viscosity of from 1 to 1200 mPas at 25° C.

The first step, the second step or both steps of the process according to the invention is/are preferably carried out in the presence of a water-insoluble organic solvent having a density of at most 0.9 kg/l (L). In the context of this invention, a water-insoluble organic solvent (L) is understood to mean solvents in which the solubility at 25° C. is below 1 g of solvent/100 g of water, for example toluene, xylene, carbon tetrachloride, n-octane. Preference is given to toluene.

The partial hydrolyzate (T) formed in the first step consists of partly Cl-terminal and possibly OH-terminal organohydropolysiloxanes and cyclic siloxanes. The content of SiCl groups still present in the partial hydrolyzate (T) is preferably from 0.5 to 5% by weight, especially from 1.0 to 2% by weight.

The first step of the process according to the invention is performed preferably at a temperature of from 0 to 80° C., more preferably from 20 to 60° C., and a pressure of from 900 to 1600 hPa.

The hydrogen chloride gas obtained in the first step can be used directly in other processes, for example with methanol to prepare chloromethane, which is in turn used in methylchlorosilane synthesis. The chlorine can thus be circulated without being released to the environment.

In the second step, the chlorine content of the partial hydrolyzate (T) is reacted fully with water. The hydrochloric acid formed preferably has a HCl content of from 3 to 20% by weight, especially from 5 to 10% by weight.

In a particular embodiment of the process according to the invention, hydrochloric acid formed in the second step is used as a water supplier in the first step. Preferably at least 90%, more preferably at least 95%, of the hydrochloric acid formed in the second step is used in the first step.

In a particularly preferred embodiment of the process according to the invention, no more than a sufficient amount of water is used such that the water of the hydrochloric acid formed is converted fully in the first step is used in the second step.

The $SiR_2O/SiR^1_2O$ ratios of the organohydropolysiloxanes (P) prepared in accordance with the invention are controlled via the weight ratio of the chlorosilane mixtures used.

The second step of the process according to the invention is carried out preferably at a temperature of from 0 to 100° C., more preferably from 10 to 60° C., and the pressure of the surrounding atmosphere, i.e. at from 900 to 1100 hPa.

In a preferred embodiment, the hydrolyzate (H) obtained after the second step is separated into organohydro-polysiloxanes (P) and a mixture (G) comprising volatile organohydropolysiloxanes. The mixture (G) is preferably recycled into the first step and/or second step or entirely or partly rearranged to less volatile, substantially linear organohydropolysiloxanes.

The mixture (G) is preferably removed by distillation, which is more preferably carried out in two stages to give mixtures (G1) and (G2). The mixtures (G), (G1), (G2) are predominantly short-chain linear and cyclic organohydrosiloxanes and possibly the solvent (L). In a first distillation stage, primarily the solvent (L) which may be used is removed. This can be supplied again in the first or second process step. The second distillation stage serves primarily to remove an organohydrosiloxane mixture (G2).

The removal of the distillates can serve for the recovery of cyclic organohydropolysiloxanes.

The first distillation stage is preferably carried out at a temperature of from 50 to 150° C., more preferably from 60 to 120° C., and an absolute pressure of from 50 to 1100 hPa.

The second distillation stage is preferably carried out at a temperature of from 80 to 200° C., more preferably from 120 to 160° C., and an absolute pressure of from 1 to 30 hPa.

Preference is given to recycling the mixtures (G), (G1), (G2) into the first step.

Optionally after removal of the solvent (L), particular preference is given to carrying out a rearrangement in the presence of a rearrangement catalyst with the mixtures (G), (G1), (G2), in order to increase the proportion of less volatile, essentially linear organohydropolysiloxanes. These catalysts are preferably strongly acidic ion exchangers, more preferably based on polystyrene and functionalized with sulfonic acid groups. The catalyst is preferably filled into a tubular reactor and especially as a loose bed, but it may also be present as a packed filling.

During the contact time, the predominant portion, preferably from 80 to 95% by weight, of the volatile organohydropolysiloxane is converted to less volatile, essentially linear organohydropolysiloxane. The mixtures (G), (G1), (G2) contain preferably up to 60% by weight of solvent (L).

The mixtures (G), (G1), (G2) can be contacted with catalyst in a reaction vessel. The reaction vessels used may be any reaction vessels, such as stirred tanks and especially tubular reactors. The mixtures (G), (G1), (G2) can either be introduced from the top above the catalyst bed, or they flow through the catalyst column from the bottom upward by means of a pump, preference being given to flow from below by means of a pump.

The crucial factors for the degree of rearrangement are amount of catalyst, residence time and temperature. Contact times of from one minute to one hundred and twenty minutes are preferred, and from two to 30 minutes are particularly preferred. The rearrangement is preferably carried out at temperatures of from −30° C. to +200° C., more preferably from 0 to 30° C., and a preferred pressure of the surrounding atmosphere, i.e. from about 900 to 1100 hPa.

In particular, the mixture (G1) is recycled directly into the first hydrolysis step, and the mixture (G2) is rearranged in the presence of rearrangement catalyst and then recycled upstream of the first distillation stage.

The process according to the invention can be carried out batchwise, semicontinuously or fully continuously, preference being given to using the fully continuous operating method of the two steps and if appropriate of the removal, processing and supply of the mixtures (G), (G1), (G2) in an integrated plant system.

FIG. 1 shows a preferred embodiment of the process according to the invention:

In the first step, the chlorosilane mixture is fed into the loop reactor (1) via line (5), water via line (10) and the distillate (G1) of the distillation unit (4), which is preferably a circulation evaporator, via line (12). Gaseous hydrogen chloride is removed via line (6), and the partial hydrolyzate (T) prepared via line (7).

The partial hydrolyzate (T) is metered into the loop reactor (2) via line (7), and water via line (8).

The entire reaction mixture is then fed via line (9) into a separator (3). The dilute hydrochloric acid is removed there via line (19) as the lower phase. The upper phase is fed via line (11) into the first distillation unit (4). The volatile constituents are recycled into the loop reactor (1) via line (12). The effluent (13) is fed into the second distillation unit (14). The volatile constituents are metered into the rearrangement reactor (16) via line (15). The rearranged stream is recycled via line (17) into the distillation unit (4). The effluent (18) comprises the OH-terminal organohydropolysiloxane (P).

All above symbols of the above formulae are each defined independently of one another. In all formulae, the silicon atom is tetravalent.

In the context of the present invention, unless stated otherwise in each case, all amounts and percentages are based on weight, all temperatures are 20° C. and all pressures are 1.013 bar (abs.). All viscosities are determined at 25° C.

EXAMPLES

The reference numerals are based on FIG. 1.

Example 1

9 kg/h of methyldichlorosilane and 100 kg/h of dimethyldichlorosilane are fed into the loop reactor (1) via line (5), 60 l/h of distillates of the circulation evaporator (4) and of the thin-film evaporator (14) via line (12), and 15 kg/h of water at 60° C. Toluene is metered into line (12) such that the toluene content in the reaction mixture of the loop reactor (1) is approx. 20%. The hydrogen chloride obtained is drawn off from the reactor in gaseous form. The partial hydrolyzate leaving the loop reactor (1) is conducted into the loop reactor (2) via line (7) as a homogeneous phase and mixed there with 100 kg/h of water which is preheated to 40° C.

The reaction mixture leaving the loop reactor (2) is fed into the separator (3) via line (9). It is separated there into the upper organic hydrolyzate phase and the lower aqueous phase. The organic hydrolyzate phase is heated for extraction through two distillation stages at up to 160° C. and 1 mbar (absolute). The distillate streams obtained in the two distillation stages (4) and (14) are fed completely into the loop reactor (1) via line (12).

The effluent (18) comprises linear OH-terminated hydromethylpolysiloxane with dimethylsilyl groups (H content 0.12%, viscosity 169 mm²/sec, HCl content 0.4 ppm, volatility at 150° C./2 h: 1.4%).

The viscosity after four months of storage time at room temperature was 175 mm²/sec, and after 11 months of storage time 186 mm²/sec. The H content remained unchanged.

Example 2

30 kg/h of methyldichlorosilane and 200 kg/h of dimethyldichlorosilane are fed into the loop reactor (1) via line (5), 100 l/h of distillate of the circulation evaporator (4) via line (12) and 32 kg/h of water at 50° C. Toluene is metered into line (12) such that the toluene content in the reaction mixture of the loop reactor (1) is approx. 20%. The hydrogen chloride obtained is drawn off from the reactor in gaseous form. The partial hydrolyzate leaving the loop reactor (1) is conducted as a homogeneous phase via line (7) into the loop reactor (2) and mixed there with 200 kg/h of water which is preheated to 60° C.

The reaction mixture leaving the loop reactor (2) is fed via line (9) into the separator (3). It is separated there into the upper organic hydrolyzate phase and the lower aqueous phase. The organic hydrolyzate phase is heated for extraction through two distillation stages at up to 160° C. and 1 mbar (absolute). The distillate stream obtained in the first distillation stage (4) is fed into the loop reactor (1), and the distillate stream (15) obtained in the second distillation stage (14) is fed fully into the rearrangement reactor (16) which is filled with a catalyst bed of a sulfonated polystyrene resin. The rearrangement reaction is carried out at 20° C. and an absolute pressure of 1100 hPa. The product (17) leaving the rearrangement reactor (16) is fed back into the distillation part of the plant (4).

The effluent (18) comprises linear OH-terminated hydromethylpolysiloxane with dimethylsilyl groups (H content 0.2%, viscosity 682 mm²/sec).

The invention claimed is:

1. A process for preparing organohydropolysiloxanes (P) bearing two terminal silicon-bonded OH groups, comprising reacting, in a first step, organohydrodichlorosilanes (A) and diorganodichlorosilanes (B) with at most 0.5 mol of water per mol of hydrolyzable chlorine to give a partial hydrolyzate (T) and gaseous hydrogen chloride, and, in a second step, treating the partial hydrolyzate (T) with water to hydrolyze the SiCl groups still present, to form hydrochloric acid, and separating a hydrolyzate (H) comprising the organohydropolysiloxanes (P), wherein the hydrolyzate (H) obtained after the second step is separated into organohydropolysiloxanes (P) and a mixture (G) comprising volatile organopolysiloxanes, and the mixture (G) is removed by distillation which is carried out in two stages in which mixtures (G1) and (G2) are obtained and at least one of (G1) or (G2) is recycled into the first step and/or second step or entirely or partly rearranged to less volatile, substantially linear organopolysiloxanes.

2. The process of claim 1, in which the OH-terminal organohydropolysiloxanes (P) have the formula 1

$$HO(SiR_2O)_m(SiR^1_2O)_nH \quad (1)$$

in which
$R^1$ each individually is hydrogen or a hydrocarbon radical which is optionally substituted by halogen or cyano radicals and has from 1 to 18 carbon atoms, R each individually is a hydrocarbon radical which is optionally substituted by halogen or cyano radicals and has from 1 to 18 carbon atoms, m is an integer from 1 to 1000 and n is an integer from 1 to 1000, with the proviso that at least one $R^1$ radical is hydrogen.

3. The process of claim 1, wherein the organohydrodichlorosilanes (A) used in the first step comprise those of formula 2

     $R^1{}_2SiCl_2$ (2)

in which $R^1$ each individually is hydrogen or a hydrocarbon radical which is optionally substituted by halogen or cyano radicals and has from 1 to 18 carbon atoms.

4. The process of claim 1, wherein the diorganodichlorosilanes (B) used in the first step comprise those of formula 3

     $R_2SiCl_2$ (3)

in which

R each individually is a hydrocarbon radical which is optionally substituted by halogen or cyano radicals and has from 1 to 18 carbon atoms.

5. The process of claim 1, wherein the first step, the second step or both steps is/are carried out in the presence of a water-insoluble organic solvent having a density of at most 0.9 kg/l (L).

6. The process of claim 1, wherein the two steps are carried out fully continuously.

7. The process of claim 1, wherein the mixture (G1) is recycled directly into the first hydrolysis step, and the mixture (G2) is rearranged in the presence of rearrangement catalyst and then recycled upstream of the first distillation stage.

* * * * *